United States Patent
Saigusa et al.

(10) Patent No.: US 8,848,056 B2
(45) Date of Patent: Sep. 30, 2014

(54) VEHICLE PERIPHERY MONITORING APPARATUS

(75) Inventors: Shigenobu Saigusa, Saitama (JP);
Yasushi Shoda, Utsunomiya (JP);
Katsuyuki Takei, Utsunomiya (JP);
Yoshitaka Yokoo, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 334 days.

(21) Appl. No.: 13/367,135

(22) Filed: Feb. 6, 2012

(65) Prior Publication Data

US 2012/0200705 A1  Aug. 9, 2012

(30) Foreign Application Priority Data

Feb. 9, 2011  (JP) .................. 2011-025614

(51) Int. Cl.
| | |
|---|---|
| *H04N 7/18* | (2006.01) |
| *G06K 9/00* | (2006.01) |
| *G01C 22/00* | (2006.01) |
| *G06T 7/20* | (2006.01) |

(52) U.S. Cl.
CPC ..... *G06T 7/2053* (2013.01); *G06T 2207/30261* (2013.01); *G06T 2200/24* (2013.01)
USPC .............................. 348/148; 382/106; 701/28

(58) Field of Classification Search
CPC .... B60R 1/00; B60R 2300/105; B60R 11/04; B60R 2300/802; H04N 7/181; G01B 11/022; G06K 9/00791; G06T 7/0075
USPC .............................. 348/148; 382/106; 701/28
See application file for complete search history.

(56) References Cited

U.S. PATENT DOCUMENTS

| | | | |
|---|---|---|---|
| 2001/0010540 A1 | 8/2001 | Ogura et al. | |
| 2007/0053551 A1* | 3/2007 | Kubo et al. | 382/106 |
| 2008/0243389 A1 | 10/2008 | Inoue et al. | |
| 2010/0231717 A1 | 9/2010 | Sasaki et al. | |

FOREIGN PATENT DOCUMENTS

| | | |
|---|---|---|
| EP | 1 223 083 A1 | 7/2002 |
| JP | 2001-216520 A | 8/2001 |
| JP | 2006-252389 A | 9/2006 |
| JP | 2007-069806 A | 3/2007 |
| JP | 2008-009843 A | 1/2008 |
| JP | 2008-242544 A | 10/2008 |

* cited by examiner

*Primary Examiner* — Dave Czekaj
*Assistant Examiner* — Tsion B Owens
(74) *Attorney, Agent, or Firm* — Carrier Blackman & Associates, P.C.; Joseph P. Carrier; William D. Blackman

(57) ABSTRACT

A vehicle periphery monitoring apparatus displays a mobile object on a display unit, encircled by a detection frame, which notifies the driver of the vehicle concerning the presence of the mobile object. A mobile object detector judges a travel path of the mobile object, and a display processor changes an area within which the detection frame is not displayed, depending on the direction in which the judged travel path extends. The detection frame is displayed only when necessary, so as to indicate the presence of the mobile object to the driver using the detection frame.

5 Claims, 14 Drawing Sheets

(LH SIDE)　　(RH SIDE)

VEHICLE PERIPHERY MONITORING APPARATUS

CROSS-REFERENCE TO RELATED APPLICATION

This application is based upon and claims the benefit of priority from Japanese Patent Application No. 2011-025614 filed on Feb. 9, 2011, of which the contents are incorporated herein by reference.

BACKGROUND OF THE INVENTION

1. Field of the Invention

The present invention relates to a vehicle periphery monitoring apparatus for displaying a mobile object, encircled by a display frame, which approaches a vehicle, in an image that is captured by an image capturing unit on the vehicle and displayed on a display unit in the vehicle.

2. Description of the Related Art

Heretofore, there have been proposed vehicle periphery monitoring apparatus for displaying an object, encircled by a display frame, which approaches a vehicle, in an image that is captured by an image capturing unit on the vehicle and displayed in a display unit on the vehicle (see Japanese Laid-Open Patent Publication No. 2001-216520 and Japanese Laid-Open Patent Publication No. 2006-252389).

The vehicle periphery monitoring apparatus disclosed in Japanese Laid-Open Patent Publication No. 2001-216520 operates in the following manner. When an image captured behind a vehicle with a camera installed on the vehicle is displayed on a display unit in the vehicle, the profile of another vehicle approaching from behind is generated as a differential image, and a display frame, the size of which grows in synchronism with the size of the other approaching vehicle, is superposed on the image of the other vehicle around a center of gravity or central point of the differential image.

The vehicle periphery monitoring apparatus disclosed in Japanese Laid-Open Patent Publication No. 2006-252389 operates in the following manner. A three-dimensional object, which approaches relatively toward a vehicle that carries a first camera and a second camera, is detected as an obstacle by the first camera and the second camera. A frame, which surrounds the detected obstacle, is generated and displayed as a combined image on a display unit in the vehicle that carries the first camera and the second camera.

SUMMARY OF THE INVENTION

According to Japanese Laid-Open Patent Publication No. 2001-216520, an approaching object is necessarily displayed while being surrounded by a display frame. Similarly, according to Japanese Laid-Open Patent Publication No. 2006-252389, an obstacle is necessarily displayed while being surrounded by a frame. According to these publications, the displayed frame may potentially annoy and bother the driver of the vehicle when the driver sees the displayed image.

It is an object of the present invention to provide a vehicle periphery monitoring apparatus, which displays a detection frame that makes the user, such as the driver of the vehicle or the like, feel less annoyed and bothered when the user sees the detection frame.

According to the present invention, there is provided a vehicle periphery monitoring apparatus comprising an image capturing device mounted on a vehicle for acquiring a captured image of a peripheral area of the vehicle, a mobile object detector for detecting a mobile object based on the captured image, a detection frame generator for generating a detection frame that encircles the mobile object detected by the mobile object detector, a display unit, and a display processor for displaying the detection frame in a superposed relation to the captured image on the display unit, wherein the mobile object detector judges a travel path of the mobile object, and the display processor changes an area in which the detection frame is not displayed, depending on the travel path judged by the mobile object detector.

The mobile object detector judges (analyzes) a travel path of the mobile object, and the display processor changes an area within which the detection frame is not displayed depending on the direction in which the judged (analyzed) travel path extends. Since the detection frame is displayed only when necessary in order to indicate the presence of the mobile object to the driver of the vehicle using the detection frame, the driver is prevented from becoming annoyed or bothered with unwanted images of the detection frame on the display unit.

Preferably, the image capturing device acquires a captured image behind the vehicle. Therefore, the image capturing device is useful as a rearward visual assistance tool at a time when the vehicle moves backwards or reverses direction.

If the travel path judged by the mobile object detector represents a direction that extends from a rear lateral area behind the vehicle and transversely across a rear area behind the vehicle, the display processor produces a non-display area for the detection frame, which includes the rear area behind the vehicle and a rear lateral area opposite to the aforementioned rear lateral area behind the vehicle.

Since the travel path extends from the rear lateral area and traverses the rear area, as long as the mobile object is moving from the rear lateral area toward the rear area, the display processor decides that it is necessary to notify the driver concerning the presence of the mobile object, and displays the detection frame that encircles the mobile object. On the other hand, when the mobile object traverses the rear area and then enters the rear lateral area, the display processor decides that it is not necessary to notify the driver concerning the presence of the mobile object, and does not display the detection frame in the non-display area. Consequently, the detection frame is displayed only when necessary in order to indicate the presence of the mobile object to the driver using the detection frame, and hence the driver is prevented from becoming annoyed or bothered with unwanted images of the detection frame on the display unit.

However, if the travel path judged by the mobile object detector represents a direction along which the mobile object approaches the vehicle from behind, the display processor does not produce a non-display area for the detection frame.

In this case, the mobile object is displayed as moving from a central back area toward a central near area of the displayed image on the display unit, and the detection frame encircling the mobile object does not move laterally, but grows progressively larger in size. The detection frame, which is displayed in this manner, is useful to draw attention of the driver to the mobile object, and is unlikely to make the driver feel annoyed or bothered.

According to the present invention, consequently, the mobile object detector judges (analyzes) a travel path of the mobile object, and the display processor changes an area within which the detection frame is not displayed depending on the direction in which the judged (analyzed) travel path extends. Since the detection frame is displayed only when necessary in order to indicate the presence of the mobile object to the driver of the vehicle using the detection frame, the driver is prevented from becoming annoyed or bothered with unwanted images of the detection frame on the display unit.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
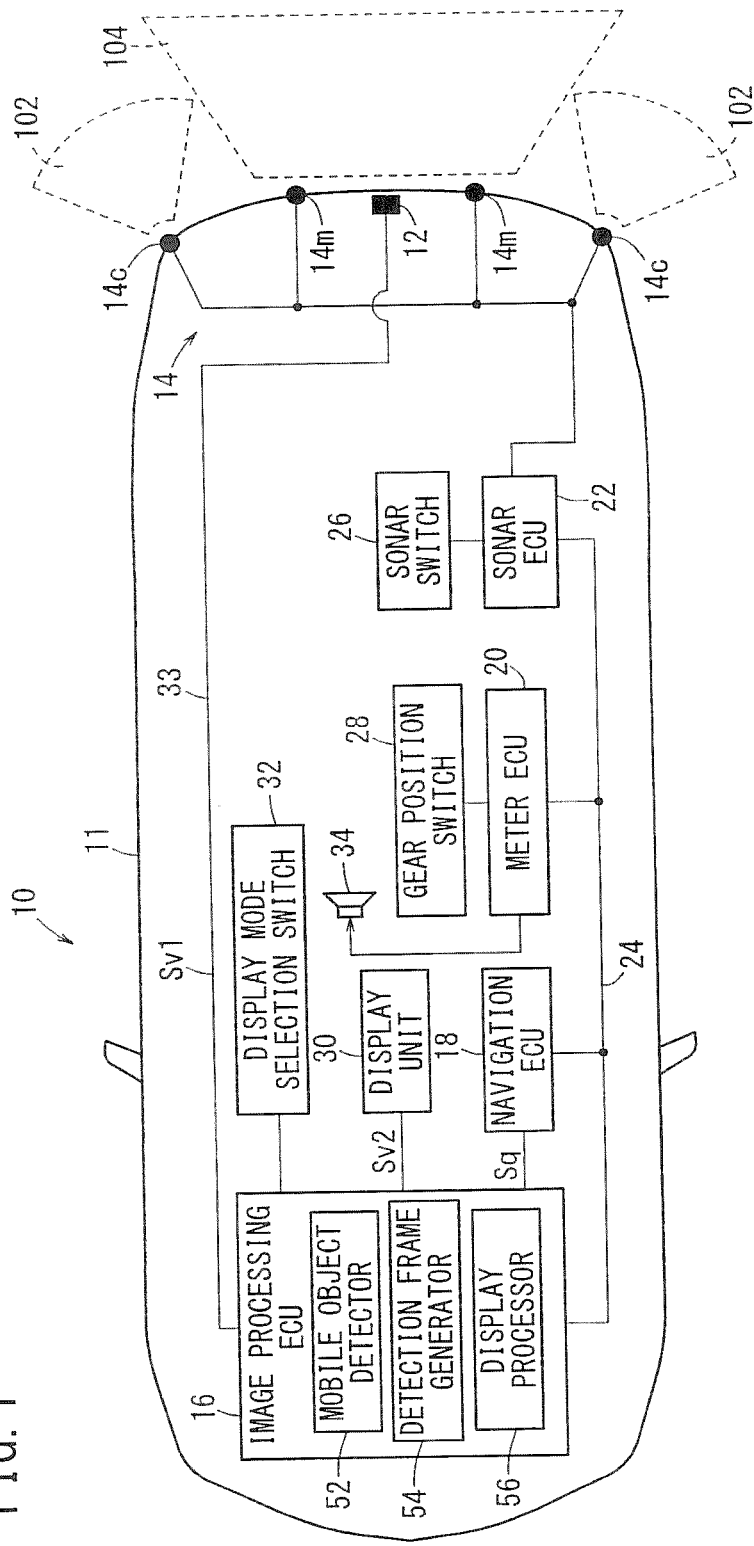
FIG. 1 is a block diagram of a vehicle, which incorporates therein a vehicle periphery monitoring apparatus according to an embodiment of the present invention.

FIG. 1 shows in block form a vehicle 11, which incorporates therein a vehicle periphery monitoring apparatus 10 according to an embodiment of the present invention.

As shown in FIG. 1, the vehicle periphery monitoring apparatus 10 includes a camera (rear camera) 12 as an image capturing device for capturing an image of a mobile object or the like, and a sonar (back sonar) array 14, which serves as an ultrasonic sensor (sonic detector) for detecting an obstacle or the like.

The camera 12 is disposed centrally or substantially centrally on the outer side of either the tail gate of the vehicle 11, if the vehicle 11 is a minivan or the like, or the trunk lid of the vehicle 11, if the vehicle 11 is a sedan or the like. The sonar array 14 includes two corner sonars 14c disposed on respective corners of the rear bumper of the vehicle 11, and two central sonars 14m disposed on a central area of the rear bumper.

The corner sonars 14c have respective detection ranges 102 each of which extends in a dotted-line sectorial shape, having a central angle of about 90° and a radius of about 60 cm rearwardly and laterally of the vehicle 11. The central sonars 14m have a joint detection range 104, which extends in a dotted-line trapezoidal shape having a length of about 1.5 m rearwardly of the vehicle 11. The camera 12 has an imaging field range, which will be described later.

The vehicle periphery monitoring apparatus 10 includes an image processing ECU (Electric Control Unit) 16, a navigation ECU 18, a meter ECU 20, and a sonar ECU 22 provided in the form of a microcomputer.

Each of the ECUs 16, 18, 20, 22 has a CPU (Central Processing Unit), a ROM (Read Only Memory) including an EEPROM (Electrically Erasable Programmable Read Only Memory), a RAM (Random Access Memory), input/output devices including an A/D converter, a D/A converter, etc., and a timer, etc. Each of the ECUs 16, 18, 20, 22 operates to perform various functions (also referred to as function performing means), e.g., a controller, an arithmetic unit, and a processor, etc., when the CPU reads programs stored in the ROM and executes the programs.

The image processing ECU 16 functions as a mobile object detector 52, a detection frame generator 54, and a display processor 56. The detection frame generator 54 also functions as a detection arrow generator, as will be described later.

The ECUs 16, 18, 20, 22 are connected to each other and perform mutual communications therebetween through a communication line 24 of a communication network such as a CAN (Controller Area Network) or the like.

A sonar switch 26 for turning on and off the detecting capability of the sonar array 14 is connected to the sonar ECU 22.

A gear position switch 28, meters or instruments, not shown, and a speaker 34, which functions as an alarm unit, are connected to the meter ECU 20. The meter ECU 20 primarily controls the display of information that is indicated on the meters or instruments, which are disposed on the dashboard of the vehicle 11.

The camera 12 and the image processing ECU 16 are connected to each other by a connecting line 33. Images, which are captured by the camera 12, are transmitted as a video signal Sv1 such as an NTSC signal or the like through the connecting line 33 to the image processing ECU 16.

A display unit 30 such as a liquid crystal display panel or the like is connected to the image processing ECU 16. The image processing ECU 16 also is connected to a display mode selection switch 32, which serves as a selector for selecting image display modes (display field ranges) for images captured by the camera 12.

The navigation ECU 18, which includes a GPS receiver as a position detecting device for detecting the position of the vehicle 11, supplies an image signal Sq representative of a map image or the like to the image processing ECU 16.

When the gear position switch 28 is shifted into a reverse position for moving the vehicle 11 in a rearward direction, the meter ECU 20 detects a reverse position signal from the gear position switch 28, and sends the reverse position signal through the communication line 24 to the image processing ECU 16. The image processing ECU 16 then supplies a video signal Sv2, which is generated by processing the video signal Sv1 from the camera 12, to the display unit 30 in preference to the image signal Sq from the navigation ECU 18.

In other words, when the gear position switch 28 is shifted into the reverse position, the display unit 30 preferentially displays a real-time vehicle rear image, which is captured by the camera 12.

According to the present embodiment, each time that the display mode selection switch 32 is actuated, the display mode selection switch 32 sequentially switches to a wide view (rear wide view) image display mode, a normal view (rear normal view) image display mode, or a top down view (rear top down view) image display mode, as a display field range to be displayed on the display unit 30. Accordingly, the display mode selection switch 32 functions as a selector for selecting, one at a time, the display field ranges represented by the above image display modes.

Depending on the view (display field range) selected by the display mode selection switch 32, the display processor 56 processes the video signal Sv1 from the camera 12 in order to generate a video signal Sv2, and supplies the generated video signal Sv2 to the display unit 30. When the display unit 30 displays a captured image represented by the video signal Sv2, the image processing ECU 16 generates images representing, respectively, a detection frame, a detection arrow, guide lines, etc., to be described later, combines the respective generated images together with the captured image, and displays the combined images on the display unit 30.

According to the present embodiment, the camera 12 is fitted with an ultra wide angle lens, such as a fisheye lens or the like, having a horizontal visual angle of about 180°, which is capable of capturing images within a wide field range. Therefore, the video signal Sv1 output from the camera 12 is representative of an imaging field range, which corresponds to the wide view image display mode.

Figure 2:
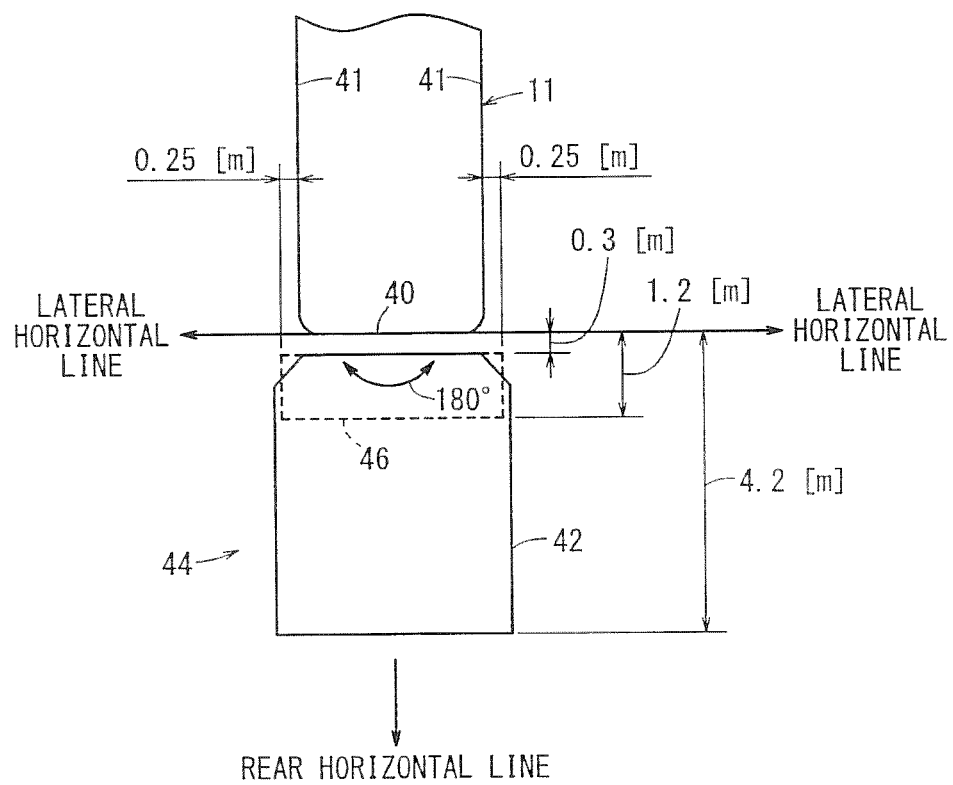
FIG. 2 is a diagram showing, by way of example, a corresponding relationship between the imaging field range of a camera and display field ranges of a display unit.

FIG. 2 schematically shows display field ranges of the display unit 30 in respective image display modes (views).

As shown in FIG. 2, the wide view image display mode includes a display field range 44, which corresponds to the imaging field range of the camera 12. The display field range 44 represents a range behind a rear end face 40 of the vehicle 11, which covers lateral horizontal lines on both sides of the vehicle 11, including the ground, and a rear horizontal line including the ground.

The normal view image display mode includes a display field range 42, which corresponds to a portion of the imaging field range of the camera 12. The display field range 42 represents a solid-line range covering up to 0.25 m or more laterally outward from side surfaces 41 of the vehicle 11, and from 0.3 m to 4.2 m behind the rear end face 40 of the vehicle 11. The display field range 42 also covers a vertical extent from the ground up to a height ranging from 2 m to 4 m. In the normal view image display mode, the display unit 30 displays an image within a range that also covers the rear horizontal line.

The top down view image display mode has a display field range 46, which represents a dotted-line range covering up to about 0.25 m laterally outward from the side surfaces 41 of the vehicle 11, and from 0.3 m to 1.2 m behind the rear end face 40 of the vehicle 11. The display field range 46 also covers a vertical extent from the ground up to a height of about 1 m, at which the camera 12 is installed. In the top down view image display mode, the display unit 30 displays an image, which represents only the ground, provided there is no object other than the ground in the display field range 46.

Basic Image Processing Sequence:

A basic image processing sequence of the vehicle periphery monitoring apparatus 10 will be described below with reference to FIGS. 3 and 4.

Figure 3:
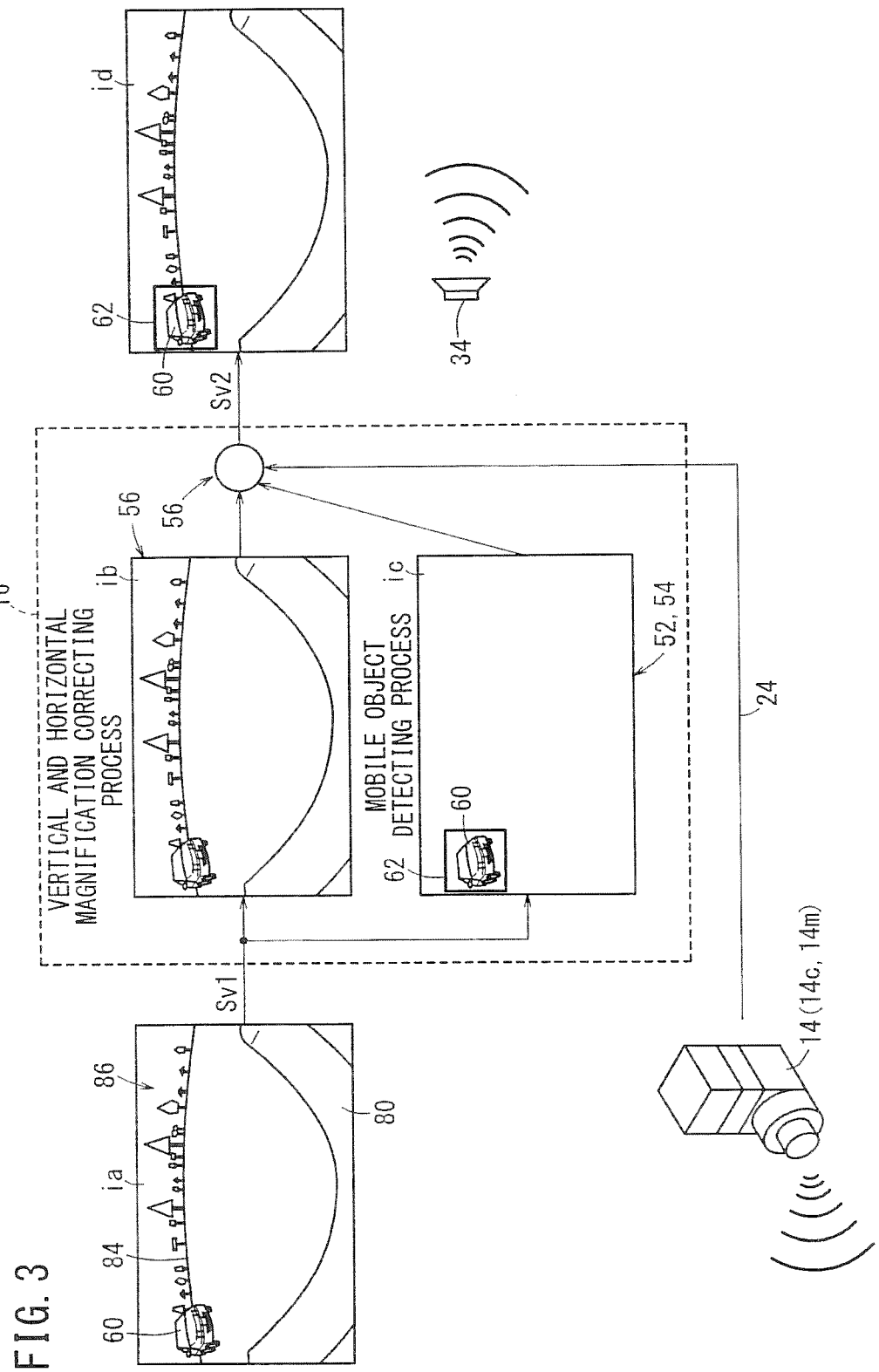
FIG. 3 is a view, which illustrates an image processing sequence of the vehicle periphery monitoring apparatus shown in FIG. 1.

FIG. 3 is a view, which is illustrative of an image processing sequence of the vehicle periphery monitoring apparatus 10.

When the gear position switch 28 is shifted into the reverse position, the camera 12 captures an image behind the vehicle 11, and supplies a video signal Sv1, representing the captured image every 1/30 second at an NTSC signal rate, through the connecting line 33 to the image processing ECU 16.

An image ia captured by the camera 12 (hereinafter referred to as a "camera image ia"), which is shown in the left-hand section of FIG. 3, is an image represented by the video signal Sv1 (imaging field range=display field range). The mobile object detector 52 of the image processing ECU 16 performs a detecting process for detecting a mobile object 60 within the camera image ia, thereby generating a differential image (second differential image) ic, which is shown in the lower middle section of FIG. 3. Then, using the differential image ic, the detection frame generator 54 generates a detection frame 62, which encircles the detected mobile object 60.

The camera image ia shown in FIG. 3 includes an image of a rear bumper 80 of the vehicle 11, which is displayed at all times, an image of the mobile object 60, and an image of a background 86 including a horizontal line 84 therein.

The display processor 56 performs, on the image ia, a vertical and horizontal magnification correcting process corresponding to an image display mode {view (display field range)}, which is selected by the display mode selection switch 32. More specifically, according to the vertical and horizontal magnification correcting process, the display processor 56 converts the camera image ia into an image ib.

In FIG. 3, the image ib, which has been processed according to the vertical and horizontal magnification correcting process in accordance with the image display mode selected by the display mode selection switch 32, is plotted as an image in the wide view image display mode, which has substantially the same field range as the camera image ia.

The detecting process performed by the mobile object detector 52 in order to detect the mobile object 60 is a known process, e.g., an interframe differential process, which is performed on the camera image ia.

Figure 4:
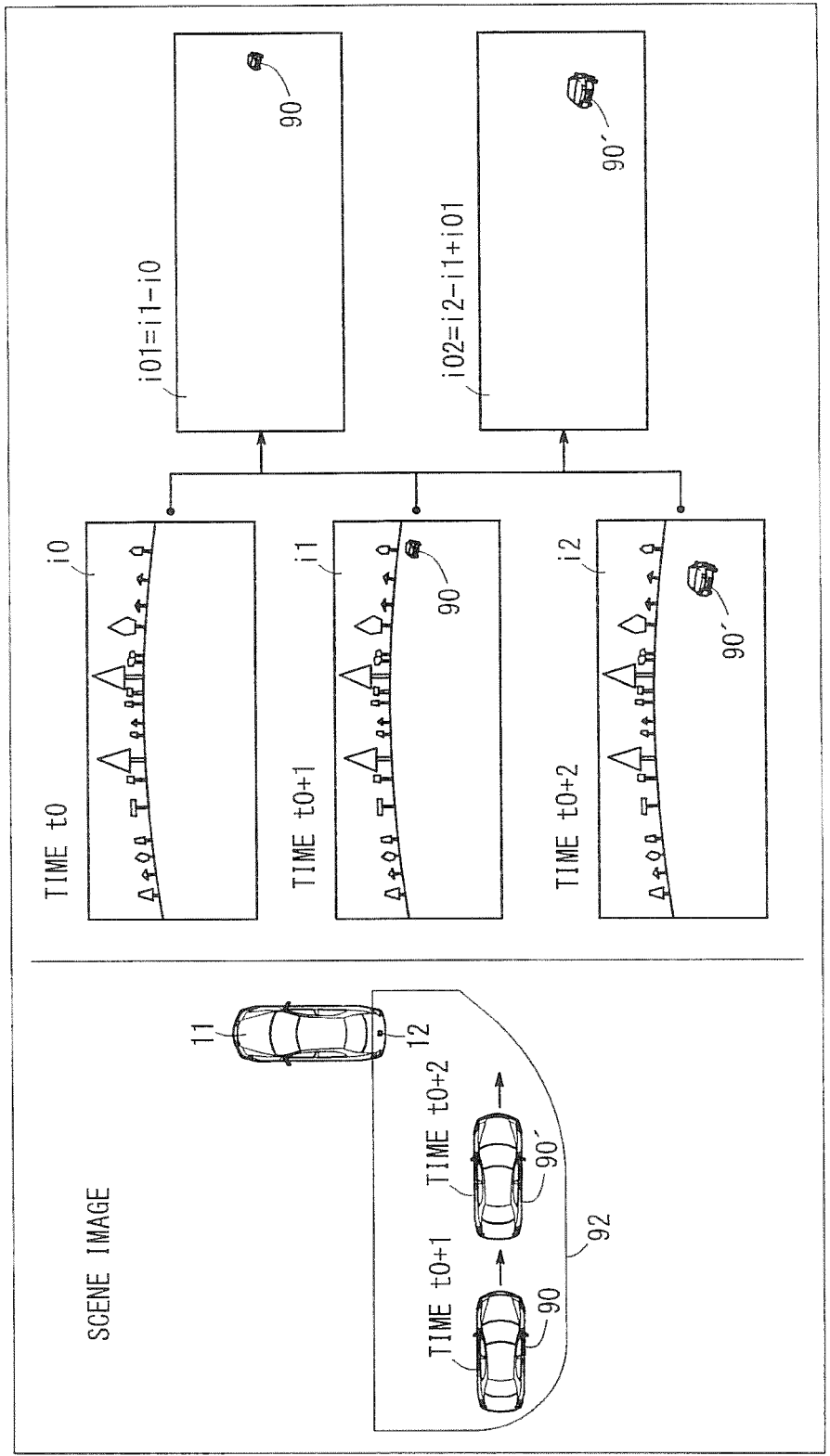
FIG. 4 is a view, which illustrates an interframe differential process for detecting a mobile object.

FIG. 4 is a view, which is illustrative of an interframe differential process as the detecting process for detecting the mobile object 60. A scene image is illustrated in plan in the left-hand section of FIG. 4. As shown in the middle section of FIG. 4, the camera 12 successively produces three camera images, i.e. i0, i1, i2, respectively at time t0, time t0+1 (1 represents a minute time $\Delta t$, which is 1/30 second), and time t0+2.

Within an imaging field range 92 of the camera 12, a mobile object 90 apart from the vehicle 11 does not exist (is not imaged) at time t0. At time t0+1, the mobile object 90 is imaged by the camera 12. At time t0+2, the same mobile object 90' is imaged at an enlarged scale as the mobile object 90' approaches the vehicle 11.

For facilitating understanding of the present invention, it is assumed that the background remains unchanged in the three camera images i0, i1, i2. Practically, the mobile object detector 52 performs the detecting process when the vehicle 11 travels in a reverse direction at a speed of 5 km/h or lower.

Consequently, the background in the three camera images i0, i1, i2 can be regarded as a still object with respect to the mobile object 90.

First, the mobile object detector 52 performs subtraction on the pixel data of the camera images i0, i1 (i01=i1−i0) in order to extract an image of the mobile object 90, i.e., a first differential image i01, from which the background image has been removed.

Then, the mobile object detector 52 performs an arithmetic operation (i02=i2−i1+i01) in order to extract a second differential image i02. More specifically, the mobile object detector 52 subtracts the camera image i1 from the camera image i2 (i2−i1) in order to delete the background, thereby leaving images of the mobile objects 90 and 90'. Then, the mobile object detector 52 removes the image i01 of the mobile object 90 according to (i2−i1)+i01, so as to extract only an image of the mobile object 90' at time t0+2, in the second differential image i02.

Therefore, as shown in FIG. 4, when the interframe differential process is performed on the camera image is represented by the video signal Sv1 shown in FIG. 3 as a detecting process for detecting the mobile object 60, the mobile object detector 52 detects, as a second differential image ic, an image only of the mobile object 60, which is shown in the lower middle section of FIG. 3.

As shown in FIG. 3, the detection frame generator 54 produces a profile image (differential image) of the second differential image ic according to a known differential process, for example, the process disclosed in Japanese Laid-Open Patent Publication No. 2001-216520. The detection frame generator 54 also generates a rectangular frame, the sides of which extend parallel to the horizontal and vertical directions, such that the rectangular frame passes through vertices of a quadrangle circumscribing the profile image. The detection frame generator 54 superposes the generated rectangular frame on the image position of the mobile object 60, to thereby serve as the detection frame 62. According to the present embodiment, a rectangular frame, which is slightly enlarged from the generated rectangular frame, is displayed as the detection frame 62 for better visibility.

The path along which the mobile object 60 travels (travel path) and the direction of the path along which the mobile object 60 travels (direction of travel path) can be obtained as a result of the mobile object detector 52 or the detection frame generator 54 plotting and storing the center of gravity of the image of the mobile object 60 as the mobile object 60 travels.

The display processor 56 then superposes the detection frame 62 on the mobile object 60 in the wide view image display mode, for example, as indicated in the image id, which is shown in the right-hand section of FIG. 3. If the sonar array 14 detects obstacles within the detection ranges 102, 104, then the display processor 56 displays the detected obstacles on the display unit 30.

When the sonar array 14 detects obstacles that exist within the detection ranges 102, 104, the meter ECU 20 produces an alarm (e.g., a series of beeps) through the speaker 34. The meter ECU 20 may also produce an alarm through the speaker 34 if the travel path of the mobile object 60 or the direction thereof is oriented toward the vehicle 11.

The basic image processing sequence of the vehicle periphery monitoring apparatus 10 has been described above.
Relationships Between the Gear Position Switch, the Display Mode Selection Switch, the Sonar Switch, and the Image Display Modes:

Relationships between selected positions of the gear position switch 28, the display mode selection switch 32, the sonar switch 26, and the image display modes will be described in detail below with reference to FIGS. 5, 6A and 6B.

When the gear position switch 28 is in a selected position other than the reverse position, the display unit 30 displays a map image from the navigation ECU 18, or a title image of an audio-visual (AV) system located in the vehicle 11. When the gear position switch 28 is shifted into the reverse position, the display unit 30 displays an image behind the vehicle 11, which is captured by the camera 12.

Figure 5:
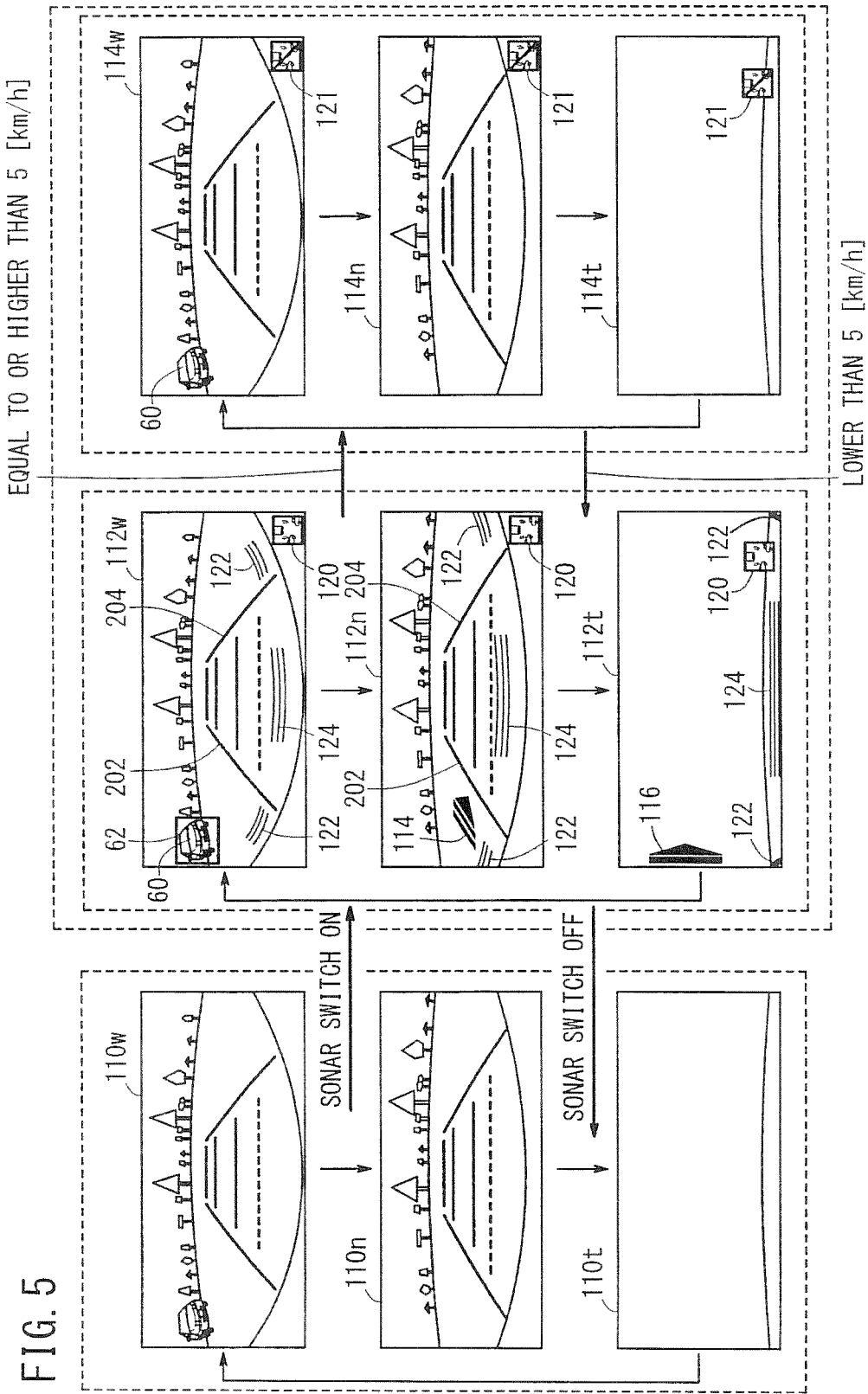
FIG. 5 is a view showing displayed images corresponding to respective selected positions of a gear position switch, a display mode selection switch, and a sonar switch.
Figure 6A:
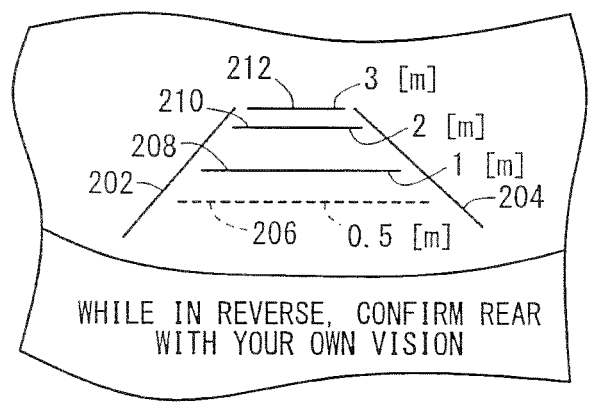
FIG. 6A is a view showing guide lines displayed on a display screen.
Figure 6B:
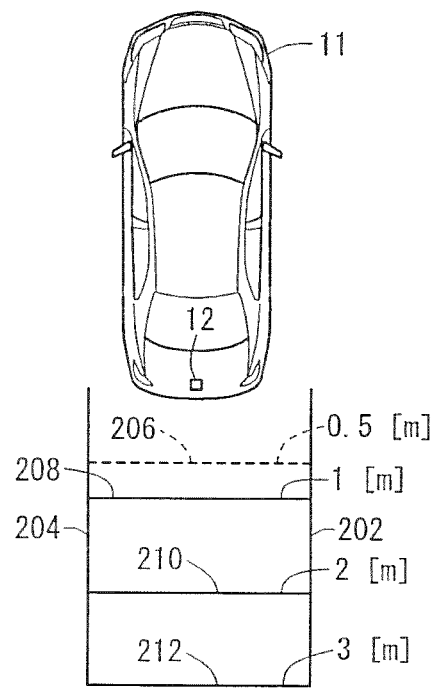
FIG. 6B is a view showing an example of how positions of the guide lines and the position of a vehicle are related to each other.

According to a comparative example in which the detection frame 62 is not displayed, as shown in the left-hand section of FIG. 5, each time that the display mode selection switch 32 is pressed, the display unit 30 cyclically switches to an image 110w (upper left) that is displayed in the display field range 44 (see FIG. 2) of the wide view image display mode (wide view image), to an image 110n (central left) that is displayed in the display field range 42 (see FIG. 2) of the normal view image display mode (normal view image), to an image 110t (lower left) that is displayed in the display field range 46 (see FIG. 2) of the top down view image display mode (top down view image), and to the wide view image 110w (upper left), and so on.

When the gear position switch 28 is shifted into the reverse position and the sonar switch 26 is turned on, if the vehicle 11 is traveling in reverse at a speed lower than 5 km/h, then, as shown in a middle section of FIG. 5, each time that the display mode selection switch 32 is pressed, the display unit 30 cyclically switches to a wide view image 112w (upper middle), to a normal view image 112n (central middle), to a top down view image 112t (lower middle), and to the wide view image 112w (upper middle), and so on. At this time, each of the images 112w, 112n, 112t includes a detection-enabled icon 120 positioned in the lower right corner thereof, which indicates that the camera 12 and the sonar array 14 are capable of detecting a mobile object 60 or the like. If the sonar array 14 detects obstacles within the detection ranges 102, 104 (see FIG. 1), then the display unit 30 displays strip-like obstacle icons 122, 124 corresponding to the detection ranges 102, 104 in a given color and at a given blinking interval. For example, if the sonar array 14 detects an obstacle only within the central joint detection range 104, then the display unit 30 displays only the obstacle icon 124. The color of the obstacle icon 124 changes depending on the distance of the vehicle 11 from the detected obstacle, and the blinking interval of the obstacle icon 124 similarly changes depending on the distance from the detected obstacle.

In the wide view image 112w shown in the middle section of FIG. 5, the detection frame 62 encircling the mobile object 60 is displayed within a predetermined area, i.e., outside of the display field range 42 (see FIG. 2) of the normal view image 112n. When a portion of the mobile object 60 begins to enter into the display field range 42 of the normal view image 112n while the wide view image 112w is being displayed, the detection frame 62 disappears from view. The reason why the detection frame 62 disappears from view at this time is that, since the driver of the vehicle 11 drives the vehicle 11 while the driver visually confirms the area behind the vehicle 11 directly, the driver is highly likely to notice the vehicle 11 by means of the driver's own vision, and the driver is prevented from becoming annoyed or bothered with unwanted images of the detection frame 62 on the display unit 30.

In the normal view image 112n or the top down view image 112t shown in the middle section of FIG. 5, the detection frame 62 is not displayed, but the mobile object 60 is displayed. When the mobile object 60 is outside of the display field range 42, if the mobile object 60 is detected within the range of the wide view image 112w, i.e., the imaging field range of the camera 12, and further is approaching the vehicle 11 (i.e., the camera 12), then the display processor 56 displays detection arrows 114, 116 generated by the detection frame generator 54 in a predetermined position, and more specifically at a predetermined position in the normal view image 112n, which will be described in detail later.

The wide view image 112w and the normal view image 112n also include guide lines superimposed thereon. As shown in FIGS. 6A and 6B, the guide lines include transverse guide lines 202, 204, which are slightly longer than the width of the vehicle 11, an open-trunk-lid guide line 206, which has a length of 0.5 m although the actual length depends on the type of vehicle 11, and guide lines 208, 210, 212, which have respective lengths of about 1 m, about 2 m, and about 3 m, respectively. The guide lines 202, 204, 206, 208, 210, 212 are displayed as semitransparent yellow lines.

When the gear position switch 28 is shifted into the reverse position and the sonar switch 26 is turned on, if the vehicle 11 travels in reverse at a speed equal to or higher than 5 km/h, then, as shown in a right-hand section of FIG. 5, each time that the display mode selection switch 32 is pressed, the display unit 30 cyclically switches to a wide view image 114w (upper right), to a normal view image 114n (central right), to a top down view image 114t (lower right), to the wide view image 114w (upper middle), and so on. At this time, each of the images 114w, 114n, 114t includes a detection-disabled icon 121 positioned in the lower right corner thereof, indicating that the camera 12 and the sonar array 14 are incapable of detecting a mobile object 60 or the like. More specifically, no detection frame 62 is displayed over the mobile object 60 in the wide view image 114w, and no detection arrows 114, 116 are disposed in the normal view image 114n and the top down view image 114t.

The relationship between selected positions of the gear position switch 28, the display mode selection switch 32, the sonar switch 26, and the image display modes has been described above.

Operations of the vehicle periphery monitoring apparatus 10 in a first inventive example (manner of displaying a detection frame depending on switching between display field ranges) and in a second inventive example (manner of displaying a detection arrow depending on the travel path of a mobile object) will be described below.

FIRST INVENTIVE EXAMPLE

Figure 7:
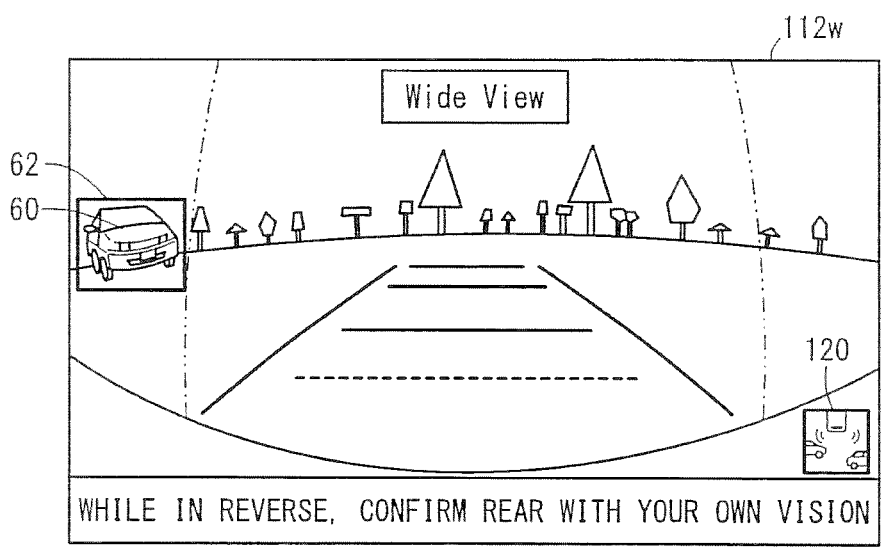
FIG. 7 is a view showing an image displayed in a wide view image display mode, with the detection frame of a mobile object being displayed therein.

Manner of Displaying a Detection Frame Depending on Switching Between Display Field Ranges As shown in FIG. 7, while the title "Wide View" and also the wide view image 112w are displayed in the wide view image display mode, if a mobile object 60 is detected outside (i.e., on the right-hand or left-hand side) of the normal view display field range indicated by the two-dot-and-dash lines as imaginary lines, then a detection frame 62 is added to the mobile object 60.

Figure 8:
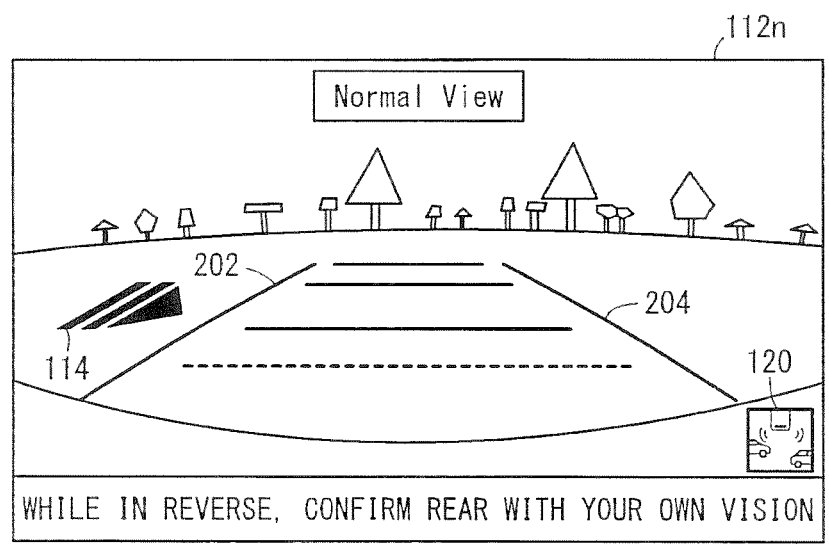
FIG. 8 is a view showing an image displayed in a normal view image display mode, with a detection arrow being displayed therein.

When the display mode selection switch 32 is pressed to change the wide view image display mode to the normal view image display mode, in which the title "Normal View" and also the normal view image 112n are displayed as shown in FIG. 8, since a mobile object 60 does not exist in the normal view display field range, although the mobile object 60 is present in the imaging field range of the camera 12, i.e., although the image of the mobile object 60 is represented by the video signal Sv1, the mobile object 60 and the detection frame 62 are not displayed in the normal view image 112n.

In the normal view image display mode, if the direction of the travel path of a mobile object 60 is detected as being oriented from the left-hand side toward the vehicle 11, then a detection arrow 114, which is directed toward the left-hand guide line 202, is displayed as a semitransparent guide line in a given position on the left-hand side (i.e., outside) of the left-hand guide line 202.

Figure 9:
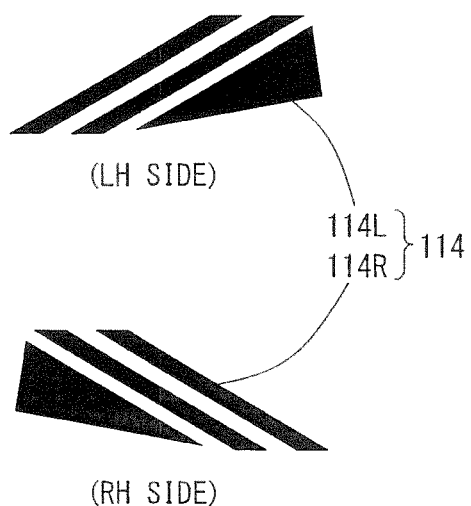
FIG. 9 is a view showing detection arrows displayed in left-hand and right-hand areas of an image in the normal view image display mode.

The detection arrow 114 will be described in detail below. As shown in FIG. 8, when the mobile object 60 is detected as approaching, from a rear left side, the left-hand guide line 202, which is displayed as inclined toward the center (right) in a direction away from the vehicle 11, a detection arrow 114L (see FIG. 9) is displayed outside of the guide line 202 as a semitransparent arrow, extending substantially perpendicularly to the guide line 202 and having a pointed end directed toward the guide line 202. When the mobile object 60 is detected as approaching, from a rear right side, the right-hand guide line 204, which is displayed as inclined toward the center (left) in a direction away from the vehicle 11, a detection arrow 114R (see FIG. 9) is displayed outside of the guide line 204 as a semitransparent arrow, extending substantially perpendicularly to the guide line 204 and having a pointed end directed toward the guide line 204.

As mentioned above, when the display mode selection switch 32 is pressed in order to change the wide view image display mode to the normal view image display mode, as shown in FIG. 8, since a mobile object 60 does not exist in the normal view display field range, although the mobile object 60 is present in the imaging field range of the camera 12, i.e., although the image of the mobile object 60 is represented by the video signal Sv1, the mobile object 60 and the detection frame 62 are not displayed in the normal view image 112n.

According to the first inventive example, even when a portion of the mobile object 60 is displayed in the normal view image display mode, as shown in FIG. 8, the display processor 56 does not display the detection frame 62. More specifically, when the mobile object 60 is not displayed in the normal view image display mode, but is approaching the vehicle 11, the detection arrow 114 is displayed, and when the mobile object 60 is displayed in the normal view image display mode, the detection frame 62 and the detection arrow 114 are not displayed.

Figure 10:
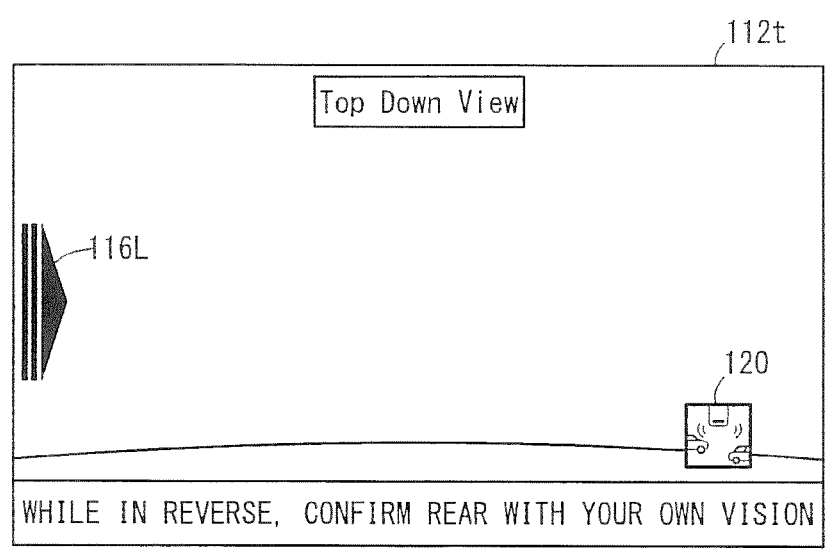
FIG. 10 is a view showing an image displayed in a top down view image display mode, with a detection arrow being displayed therein.
Figure 11:
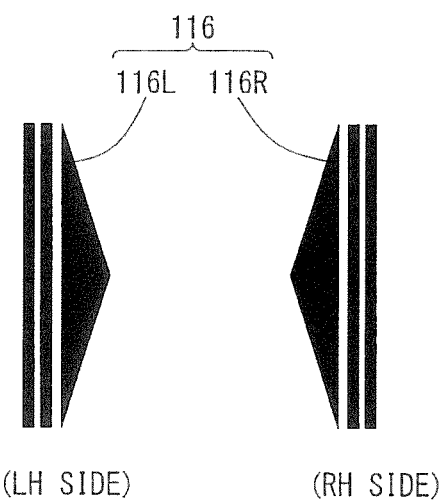
FIG. 11 is a view showing detection arrows displayed in left-hand and right-hand areas of an image in the top down view image display mode.

When the display mode selection switch 32 is pressed in order to change the wide view image display mode, as shown in FIG. 7, to the top down view image display mode, in which the title "Top Down View" and also the top down view image 112t are displayed as shown in FIG. 10, if a mobile object 60 is detected as approaching the vehicle 11 from the left in the top down view image 112t, then a detection arrow 116L, which is oriented horizontally toward the center of the top down view image 112t, is displayed in a predetermined position in a left-hand side section of the top down view image 112t, i.e., in a central position at the left-hand edge of the top down view image 112t.

In the top down view image display mode, when the mobile object 60 approaches the vehicle 11 from the left in the top down view image 112t, the display processor 56 displays a detection arrow 116L oriented toward the center of the top down view image 112t, in a predetermined position in a left-hand side section of the top down view image 112t. Also, when the mobile object 60 approaches the vehicle 11 from the right in the top down view image 112t, the display processor 56 displays a detection arrow 116R oriented toward the center of the top down view image 112t, in a predetermined (central) position in a right-hand side section of the top down view image 112t.

As described above, in the first inventive example, the vehicle periphery monitoring apparatus 10 includes the camera 12 mounted on the vehicle 11 as an image capturing device for acquiring a captured image of a peripheral area of the vehicle 11, the mobile object detector 52 for detecting the mobile object 60 based on the captured image, the detection frame generator 54 for generating the detection frame 62, which encircles the mobile object 60 detected by the mobile object detector 52, the display unit 30, and the display processor 56 for displaying the detection frame 62 in a superposed relation to the captured image on the display unit 30.

The vehicle periphery monitoring apparatus 10 also includes the display mode selection switch 32, which serves as a selector for selecting display field ranges for the captured image. The detection frame generator 54 selectively displays or does not display the detection frame 62, depending on the display field range selected by the display mode selection switch 32. Accordingly, the detection frame 62 can optimally be displayed or not, depending on the selected display field range. In other words, a display field range can be selected in optimum combination with a displayed detection frame or a non-displayed detection frame.

When the detection frame 62 is not displayed, the display processor 56 may display the detection arrows 114, 116, which indicate the direction of travel of the mobile object 60, so that the driver or user (image viewer) can recognize the direction in which the mobile object 60 travels at present, even though the mobile object 60 is not displayed in the display field range.

Inasmuch as the camera 12 is installed so as to acquire a captured image behind the vehicle 11, the camera 12 is useful as a rearward visual assistance tool at a time that the vehicle 11 moves backwards or in reverse. The driver, however, will basically confirm the rearward with its own vision while driving a car in reverse, as shown in a warning at the bottom of each of FIGS. 7, 8, 10 or the like.

When the camera 12 is used as a rearward visual assistance tool, the display processor 56 switches between the normal view image display mode or the top down image display mode, which provides a first display field range for displaying a predetermined area behind the vehicle 11, and the wide view image display mode, which provides a second display field range for displaying an area greater than the predetermined area behind the vehicle 11, depending on the display field range selected by the display mode selection switch 32. When the first display field range (the normal view image display mode or the top down image display mode) is selected, the display processor 56 does not display the detection frame 62. When the second display field range (the wide view image display mode) is selected, the display processor 56 displays the detection frame 62. Therefore, in the second display field range (the wide view image display mode shown in FIG. 7) in which the mobile object 60 is displayed at a relatively small scale, the displayed detection frame 62 allows the driver to easily identify the mobile object 60. On the other hand, in the first display field range (the normal view image display mode shown in FIG. 8, for example) in which the mobile object 60 is displayed at a relatively large scale, the driver can visually recognize the mobile object 60 appropriately.

Stated otherwise, when the mobile object 60, which approaches the vehicle 11 from behind, comes within a predetermined distance from the vehicle 11, the display processor 56 does not display the detection frame 62, thereby enabling the driver to visually recognize the mobile object 60 appropriately.

SECOND INVENTIVE EXAMPLE

Manner of Displaying a Detection Arrow Depending on the Travel Path of a Mobile Object In the second inventive example, the vehicle periphery monitoring apparatus 10 includes the camera 12, which is mounted on the vehicle 11 as an image capturing device for acquiring a captured image of a peripheral area of the vehicle 11, the mobile object detector 52 for detecting the mobile object 60 based on the captured image, the detection frame generator 54 for generating the detection frame 62 that encircles the mobile object 60 detected by the mobile object detector 52, the display unit 30, and the display processor 56 for displaying the detection frame 62 in a superposed relation to the captured image on the display unit 30.

The mobile object detector 52 judges (analyzes) the travel path of the mobile object 60, and the display processor 56 changes an area within which the detection frame 62 is not displayed, depending on the direction in which the judged (analyzed) travel path extends. Since the detection frame 62 is displayed only when necessary in order to indicate the presence of the mobile object 60 to the driver using the detection frame 62, the driver is prevented from becoming annoyed or bothered with unwanted images of the detection frame 62 on the display unit 30.

In the second inventive example, inasmuch as the camera 12 is installed so as to be capable of acquiring a captured image behind the vehicle 11, the camera 12 also is useful as a rearward visual assistance tool, at a time that the vehicle 11 moves backwards or in reverse.

Figure 12:
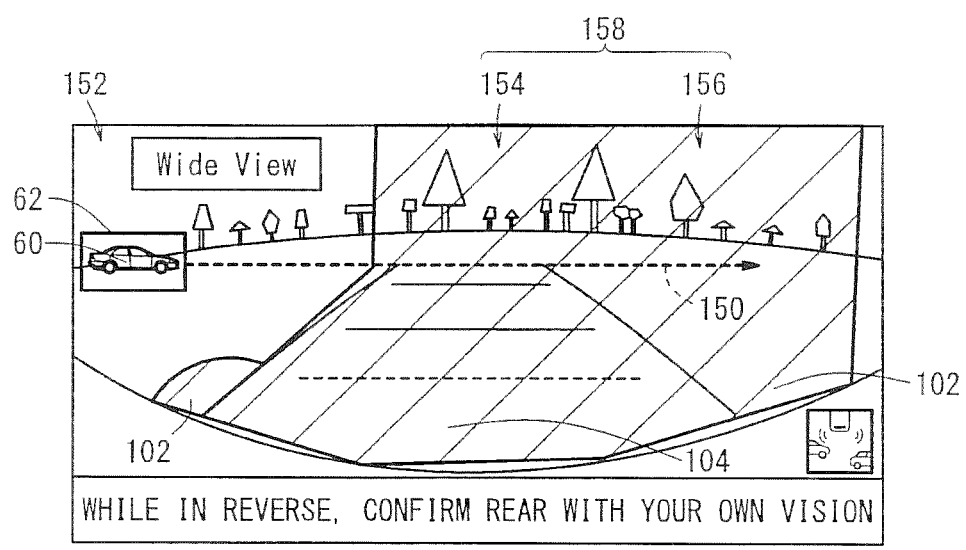
FIG. 12 is a view showing an example of a display area and a non-display area for a detection frame in the wide view image display mode.

More specifically, in the wide view image display mode, as shown in FIG. 12, if the mobile object 60 travels along a travel path 150, i.e., along the direction in which the travel path 150 extends, which is judged (analyzed) by the mobile object detector 52, and the travel path 150 represents a direction that extends from a rear lateral area 152 behind the vehicle 11 and transversely across a rear area 154 behind the vehicle 11, then the display processor 56 produces a non-display area 158, shown in hatching, for the detection frame 62, which includes the rear area 154 and a rear lateral area 156 that is located opposite to the rear lateral area 152 across the rear area 154. Accordingly, the driver does not visually recognize, and hence is prevented from becoming annoyed or bothered with, the detection frame 62 for the mobile object 60, which does not actually approach the vehicle 11. Detection ranges 102, 104 of the sonar array 14 are included within the non-display area.

The detection frame 62, which is selectively displayed and not displayed in the wide view image display mode as shown in FIG. 12, will be described in detail below. Since the travel path 150 extends from the rear lateral area 152 and traverses the rear area 154, as long as the mobile object 60 is moving from the rear lateral area 152 toward the rear area 154, the display processor 56 decides that it is necessary to notify the driver concerning the presence of the mobile object 60, and displays the detection frame 62 that encircles the mobile object 60. When the mobile object 60 traverses the rear area 154 and then enters the rear lateral area 156, the display processor 56 decides that it is not necessary to notify the driver concerning the presence of the mobile object 60, and does not display the detection frame 62 in the non-display area 158, which is shown in hatching. Consequently, the detection frame 62 is displayed only when necessary to notify the driver concerning the presence of the mobile object 60 using the detection frame 62, and hence, the driver is prevented from becoming annoyed or bothered with unwanted images of the detection frame 62 on the display unit 30.

Figure 13:
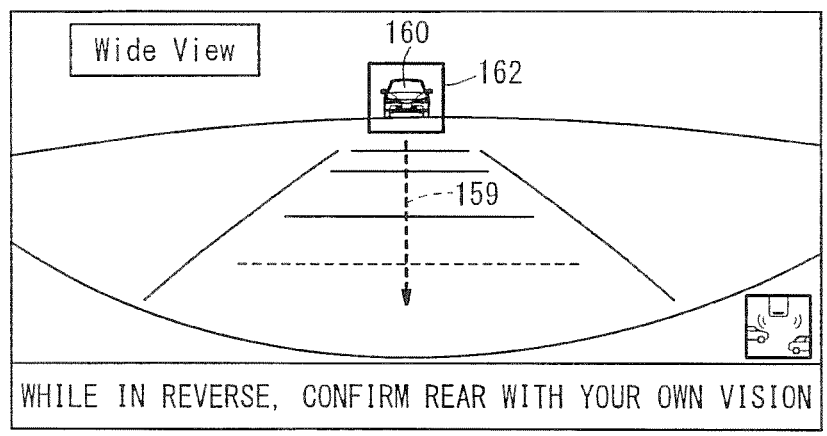
FIG. 13 is a view showing another example of a display area and a non-display area for a detection frame in the wide view image display mode.

However, in the wide view image display mode shown in FIG. 13, if a mobile object 160 travels along a travel path 159, i.e., along the direction in which the travel path 159 extends, which is judged (analyzed) by the mobile object detector 52, and the travel path 159 represents a direction along which the mobile object 160 approaches the vehicle 11 from straight behind, the display processor 56 does not produce a non-display area for the mobile object 160. In this case, the mobile object 160 is displayed as moving from a central back area toward a central near area of the wide view image, and the detection frame 162 encircling the mobile object 160 does not move laterally, but grows progressively larger in size. The detection frame 162, which is displayed in this manner, is useful to draw the attention of the driver to the mobile object 160, and is unlikely to make the driver feel annoyed or bothered.

Figure 14:
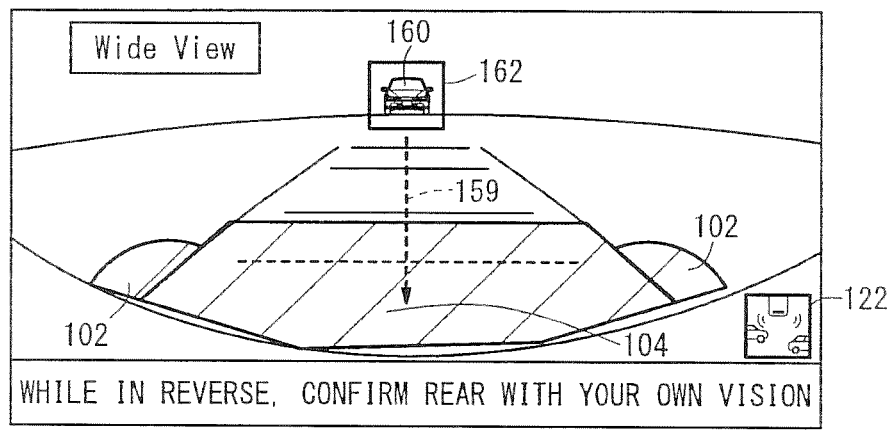
FIG. 14 is a view showing the manner in which a sonar detection range in the wide view image display mode is converted into a non-display area for a detection frame.

At this time, as shown in FIG. 14, the detection ranges 102, 104 of the sonar array 14 may be included in a non-display area for the detection frame 162.

The principles of the present invention are not limited to the detection of a mobile object behind the vehicle 11, as has been described in the above embodiment, but also may be applied to the detection of a mobile object in front of the vehicle 11.

Although certain preferred embodiments of the present invention have been shown and described in detail, it should be understood that various changes and modifications may be made to the embodiments without departing from the scope of the invention as set forth in the appended claims.

What is claimed is:

1. A vehicle periphery monitoring apparatus comprising:
   an image capturing device mounted on a vehicle, for acquiring a captured image of a peripheral area of the vehicle;
   a mobile object detector for detecting a mobile object based on the captured image;
   a detection frame generator for generating a detection frame that encircles the mobile object detected by the mobile object detector;
   a display unit; and
   a display processor for displaying the detection frame superposed upon the captured image in a display area on the display unit,
   wherein the mobile object detector judges a travel path of the mobile object, and
   the display processor sets a plurality of areas on the captured image, including a non-display area in which the detection frame is not displayed and including the display area, depending on the travel path judged by the mobile object detector.

2. The vehicle periphery monitoring apparatus according to claim 1, wherein the image capturing device acquires a captured image behind the vehicle.

3. The vehicle periphery monitoring apparatus according to claim 2, wherein if the travel path judged by the mobile object detector represents a direction that extends from a first rear lateral area behind the vehicle and transversely across a rear area behind the vehicle, the display processor produces the non-display area for the detection frame, which includes the rear area behind the vehicle and a second rear lateral area opposite to the first rear lateral area behind the vehicle.

4. The vehicle periphery monitoring apparatus according to claim 2, wherein if the travel path judged by the mobile object detector represents a direction along which the mobile object approaches the vehicle from behind, the display processor does not produce the non-display area for the detection frame.

5. The vehicle periphery monitoring apparatus according to claim 3, wherein if the travel path judged by the mobile object detector represents a direction along which the mobile object approaches the vehicle from behind, the display processor does not produce the non-display area for the detection frame.

\* \* \* \* \*